United States Patent [19]

Lichvar

[11] Patent Number: 4,819,582
[45] Date of Patent: Apr. 11, 1989

[54] KNOCK-DOWN ANIMAL CAGE

[76] Inventor: Jerry L. Lichvar, 161 San Marcos Blvd., San Marcos, Calif. 92069

[21] Appl. No.: 112,514

[22] Filed: Oct. 26, 1987

[51] Int. Cl.⁴ .............................................. A01K 31/00
[52] U.S. Cl. ....................................................... 119/17
[58] Field of Search ........................ 119/16, 17, 18, 19, 119/20

[56]     References Cited
        U.S. PATENT DOCUMENTS
        3,381,663  5/1968  Dayton ................................. 119/17
        4,696,259  9/1987  Fewox .................................. 119/19

Primary Examiner—Robert Peshock
Attorney, Agent, or Firm—John J. Murphey

[57]     ABSTRACT

A knock-down animal cage comprising a plurality of panels, each having a marginal frame comprised of a plurality of lengths to resist cold flow, the lengths being joined at their ends by elbows in closed relation, the panels being marginally connected together by corral clamps, the area defined by each panel being covered by a wire mesh or tarpaulin, except for at least one panel which defines a portal for passage of the cage into and out of the case, and a door associated with each portal for latchingly closing its associated portal.

8 Claims, 2 Drawing Sheets

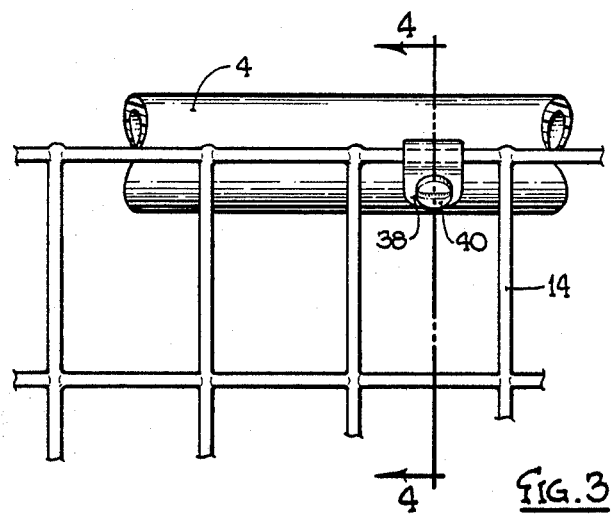
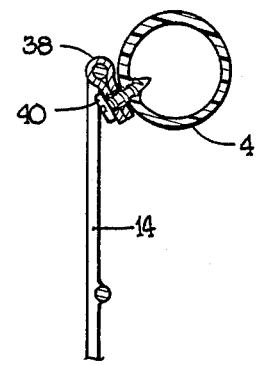
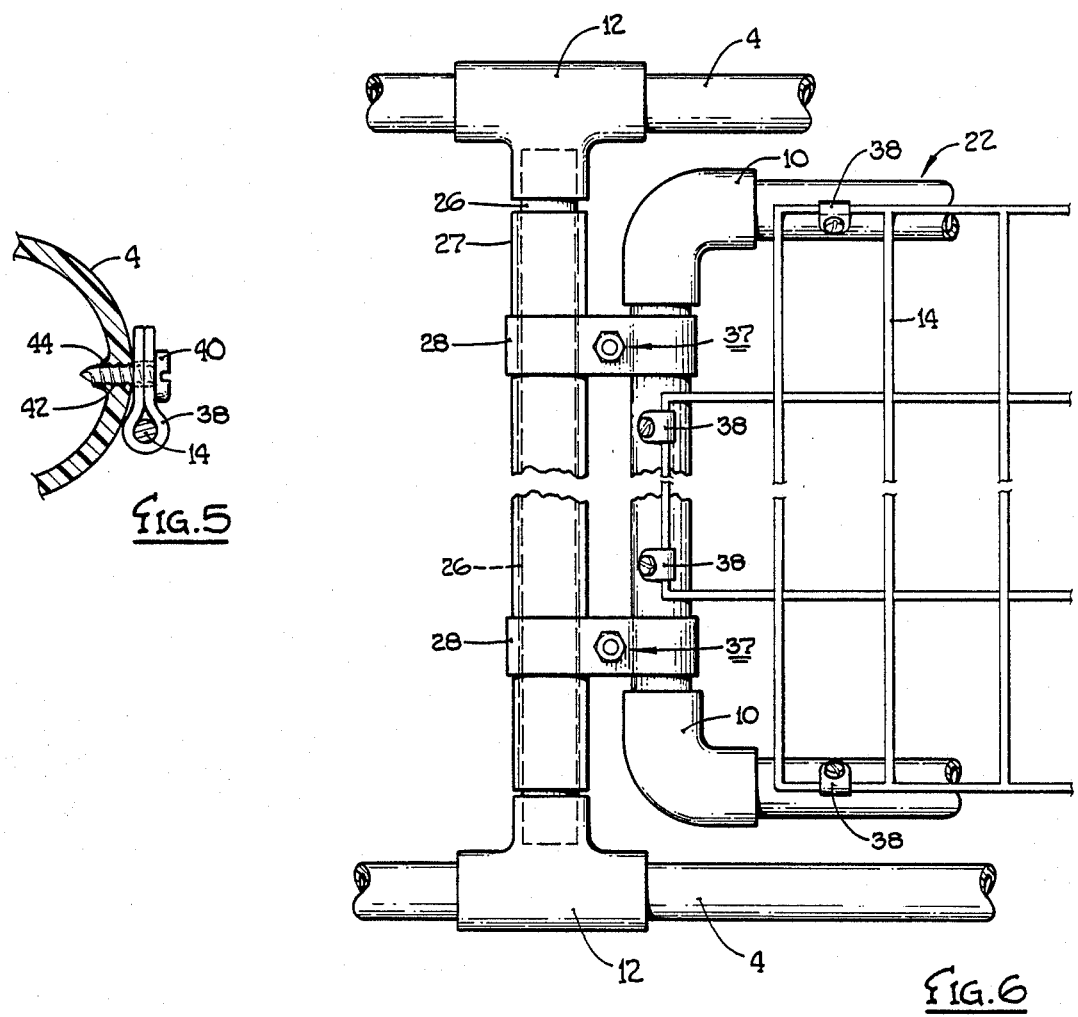

KNOCK-DOWN ANIMAL CAGE

BACKGROUND OF THE INVENTION

1. Field of the Invention

This invention relates in general to knock-down animal cages, and in particular to light-weight transportable cages. This invention presents a light-weight, strong and durable cage which can be assembled as a permanent cage or which is adapted to be easily disassembled and reassembled. The sides and top of the cage comprise preassembled panels which can easily be configured into one or a plurality of adjacent cage units. This invention is ideal for domestic animals such as cats and dogs, but it may be used for a wide variety of animals, e.g., farm animals such as chickens and other fowl.

Heretofore, portable knock-down cages for such animals conventionally comprise assemblies of panels made from small gauge wire with no rigid framework. The panels are so made in order to keep the assembled cages light-weight and portable. However, such cages are not very stable, that is, they can easily be bent or collapsed because the panels have no rigid frame structure, and the assembled panels are typically held together at their edges by wire clips.

Other conventional transportable cages comprise assemblies of panels which are rigidly framed, but heretofore the rigid framing comprised metal slats and bars. The metal frames increase the strength and rigidity of the cage but are much heavier than the all-wire cages, thus creating an unavoidable trade-off:weight verses strength and stability. For larger animals such as large to medium size dogs, the strength and stability of a metal framed cage is necessary, but the weight of metal framed cages makes them only portable when disassembled i.e. knocked-down, or very strenuously portable when erect.

As described above, this invention overcomes these problems. The panels of this invention are sturdy and rigid, but nevertheless very light-weight. When assembled they form a very strong and stable cage with the panels firmly held together by strong clamps. The panels of this invention are comparable to the conventional metal framed panels but without the penalty of the additional weight. For example, a typical metal framed cage for an 80-pound dog is at least 200 pounds. This invention presents a cage with sufficient strength and stability to contain such an animal but which weighs approximately 50 pounds, or at least 150 pounds lighter. It can therefore be seen that the cages constructed according to this invention are significantly more easily portable, whether knocked-down or erect.

Other advantages and attributes of this invention will be readily discernible upon the reading of the text hereinafter.

SUMMARY OF THE INVENTION

A knock-down cage comprising a rectangular parallelepiped frame of light-weight plastic tubing, preferably polyvinyl chloride (PVC) tubing impregnated with a resin making it relatively impervious to the damaging effects of ultraviolet rays and with a hardened outside skin, mesh means covering all areas defined by the frame except a portal, and a door means hinged to the frame for closing the portal. Preferably the rectangular parallelepiped frame comprises a plurality of rectangular, mesh covered panels orthogonally connected at their margins by a plurality of clamping means. Preferably each clamping means comprises opposing jaws urged together by hand-tightenable screw means, each clamping means being adapted to grip two of the plastic tubes and hold them in close juxtaposed relation, i.e. side-by-side in generally parallel fashion.

An object of this invention is to provide a knock-down cage with the light-weight characteristics of conventional unframed wire cages, and with the stability and strength comparable to conventional metal framed cages.

Another object of this invention is to present a knock-down cage of clamped-together panels having polyvinyl chloride tube frames wherein the tubes have hardened outer skins to resist plastic deformation caused by cold flow of the tube material which would otherwise occur because of the clamping stress.

Another object of this invention is to provide a knock-down cage framed in light-weight polymeric tubing, such as polyvinyl chloride tubing wherein the tubing is impregnated with a substance which makes the tubing more resistant to the damaging effects of ultraviolet rays.

Another object of this invention is to provide a knock-down cage comprising a plurality of marginally joined, meshed covered panels framed in light-weight polymeric tubing, such as polyvinyl chloride tubing, the mesh associated with each panel being supportive of the structure of said panel.

Another object of this invention is to provide a knock-down cage comprising a plurality of marginally joined, meshed covered panels framed entirely in light-weight polymeric tubing, such as polyvinyl chloride tubing, at least one such panel defining a portal for ingress and egress, the portal being likewise framed in said tubing, the portal being closeable by a likewise framed and covered door, a straight member of the frame of said door being hinged to a straight member of the frame of said portal by means of said door frame straight member being rigidly clamped in close juxtaposed relation with a sleeve loosely fitted over said portal frame straight member.

Other objects of this invention will be readily discernible upon reading of the text hereinafter.

BRIEF DESCRIPTION OF THE DRAWINGS

FIG. 3 is a detail view of an affixation of a mesh to a frame member.

FIG. 4 is a section view taken along lines 4—4 of FIG. 3.

FIG. 5 is a detail section of a clamp affixing a mesh to a frame member.

FIG. 6 is a partial side elevational view of a door hinge means.

DESCRIPTION OF THE PREFERRED EMBODIMENT

Figure 1:
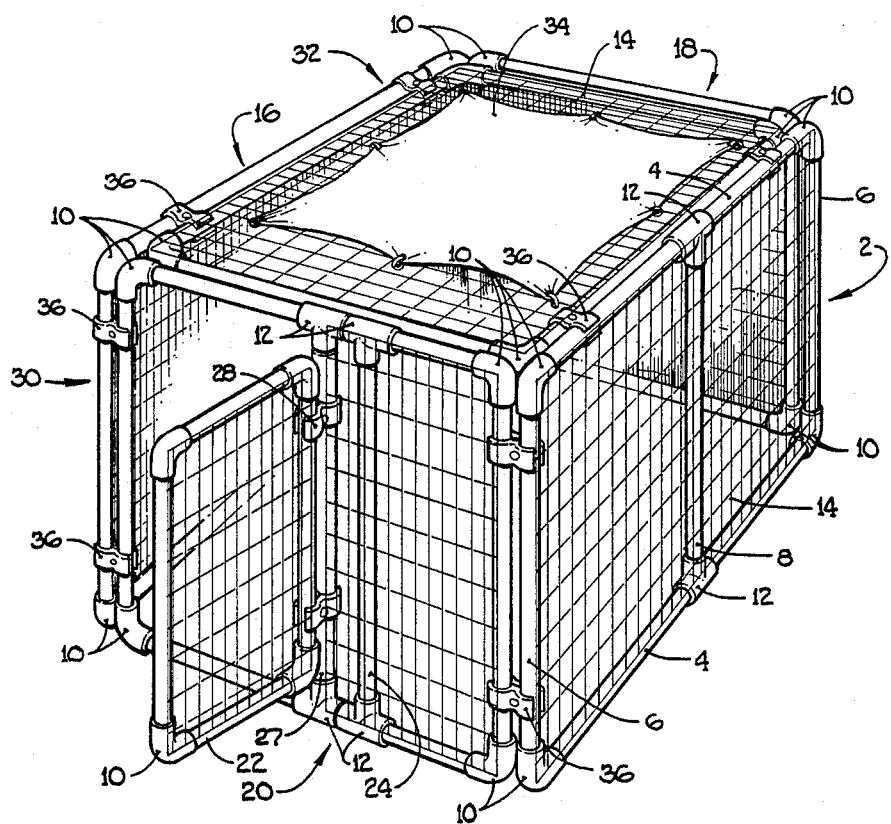
FIG. 1 is a perspective view of a single unit cage.

Referring to FIG. 1, a generally planar, rectangular right-side panel 2 is seen to be framed by a plurality of light-weight, polymeric tube members, preferably made of polyvinyl chloride (PVC) tubing. The panel 2 has a first pair of spaced, straight members 4 terminally joined in orthogonal relation, i.e., at right angles to each other, with a second pair of spaced, straight members 6 to form a rectangular frame. A centrally disposed cross member 8 extends between the first pair 4 intermediate the second pair 6. The members are made from lengths of straight tubing joined at their ends by right elbows 10. The centrally disposed cross member B is a length of straight tubing joined to the members 4 by means of "T" connections 12. A suitably sized piece of welded-wire mesh 14 is affixed to the outboard side of the panel and extends over the entire area defined by the marginal frame members 4 and 6 of the panel.

Figure 2:
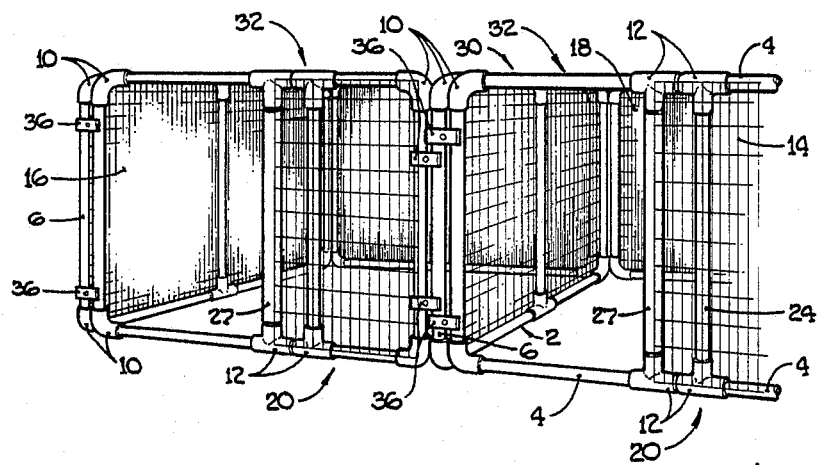
FIG. 2 is a perspective view of a multiple unit cage with the doors removed for clarity of observation.

Referring to FIGS. 1 and 2, a left-side panel 16 is identical to the right-side panel 2. A back-side panel 18 is identical to the left-side and the right-side panels in structure, but may be different in rectangular dimensions. A generally planar rectangular front panel 20 includes a hinged door 22. The front panel 20, like the other panels is framed by straight lengths of lightweight, plastic tubing joined at their ends by right elbows 10, and a cross member 24 is affixed at its ends to opposite horizontal members by "T" Connections 12. The cross member 24 however is not necessarily centrally disposed; it may be offset to one side to allow for additional or less space for a portal for ingress and egress closeable by the hinged door 22. In FIG. 1 it is slightly offset to the right of center but it could be offset left or not offset at all depending on the overall size of the panel and the width of the door. The portion of the front panel 20 not closeable by the door is screened in the same fashion as the other panels are screened, preferably by welded-wire mesh. To the door side of the cross member 24 and in close proximity thereto is a second cross member 26.

The second cross member 26 provides a vertical and rigid member upon which to hang the door 22. It should be noted that optionally the cross members 24 and 26 could be one and the same, that is, a single cross member could perform the functions of both members 24 and 26. The cross member 26 and portions of the marginal frame members of the panel 20 define and frame the aforesaid portal 30, a portal by which the animal can enter or exit the cage. A rectangular door 22 framed by straight lengths of the same tubing, which are joined at their ends by right elbows 10, and covered by the welded-wire mesh is hingedly hung onto the second cross member 26 by means of a straight member of the door frame being rigidly clamped to and in close juxtaposed relation with a sleeve 27 loosely fitted over cross member 26, the fit of the sleeve being suitable to permit the sleeve to freely rotate about cross member 26 but also suitable to vertically support the door without excessive play. An example of this is to use a one-inch nominal diameter tube (inside diameter 1-5/32 inches; outside diameter 1-10/32 inches) as vertical tube 26 and a one, one-quarter inch nominal diameter tube (inside diameter 1-11/23 inches; outside diameter 1-21/32 inches) as tube 27. Clamps 28 which hold the door frame rigidly to the sleeve 27 are preferably "corral clamps" as hereinafter described.

Referring again to FIG. 1, a top panel 32 is likewise framed by straight lengths of the same tubing joined at their ends by right elbows 10 with a welded-wire mesh 14 covering the entire area defined by the top panel. Optionally, a suitably sized swatch of tarpaulin 34 or the like can be adapted to cover the top panel so as to shield the inside of the cage from sunlight and precipitation.

Referring again to FIG. 1, it can be seen that adjacent panels are joined in close orthogonal relation by clamps 36. Preferably the clamps used are of a type commonly called "corral clamps". Each clamp is adapted to releasably and rigidly hold a pair of adjacent panels in orthogonal relation by rigidly gripping a marginal member of each panel and holding them in close juxtaposed relation. Tightening the clamps while the panels are at generally a right angle to each other will hold them in said orthogonal relation. The corral clamps comprise opposing jaws, each jaw being a double-arcuated metal strip. The curvature of each arc is adapted to conform generally to the outer curvature of the marginal members of the panels. The arcs of each strip are aligned in parallel such that a pair of members axially disposed in the saddles of adjacent arcs are juxtaposed and parallel with little space in between. The opposing pieces of the clamps are urged together by screw means 37 such as a bolt and wing nut. The clamps 28 of the door hinge means preferably are identical to the clamps 36.

The PVC tubing preferably used as the structural components of this cage is unique and different rom the PVC pipe generally used for plumbing purposes. PVC pipe typically used in plumbing is made such that the inner skin of the pipe is harder than the outer skin to withstand the impact of cleaning devices, such as plumbing snakes, whereas the PVC tubing used as the structural components of this invention is made such that the outside skin is the harder surface. This is so in order to make the tubing more resistant to damage which can be caused by objects impacting the frame or from a caged animal chewing on the frame.

The outside hardness also serves to prevent plastic deformation of the tube material under the stress of the clamps 36. Ordinary PVC pipe subjected to the clamping stresses of this invention tends to cold flow and deform beneath the clamps, thereby weakening the structure and loosening the grip of the clamps. Furthermore, the rate of cold flow in PVC increases with deform under the stress of the clamps at accelerated rate. The hardened outside skin of the PVC tubing of this invention is much more resistant to cold flow and therefore more resistant to plastic deformation. Such outside skin hardened tubing is made by the same process which conventionally hardens the inside skin. For example, there are well-known techniques for making an amorphous material such as plastic more viscous by the addition of fillers and various other reinforcing materials such as glass fibers and glass cloth. By making the material more viscous the rate of cold flow is reduced and can be reduced to a point of insignificance. Heretofore, however, these processes were not applied to the outside skin of PVC tubing.

The PVC tubing used for this invention is also unique in that it contains a resin which makes it resistant to the effects of ultra violet light (UV). The resin is added by well known techniques used for impregnating resins in polymers in general, and resins which are resistant to UV are also known, but heretofore such resins have not been impregnated in PVC tubing nor to extent it is impregnated in this invention. The level of resin in the tubing of this invention makes the tubing at least six times more resistant to the ill effects of UV than ordinary PVC.

Referring to FIG. 2, it can be seen that the panels (2, 16, 18, 20 and 32) comprising a multiple unit cage are identical in structure to the panels of FIG. 1. The multiple unit cage actually comprises a plurality of the cages of FIG. 1 abutted together. It should be noted, however, that adjacent cages or units share a common side panel between them. For example, if a first cage abuts a second cage on the first cage's right and the second cage's left, either the right-side panel 2 of the first cage or the left-side panel 16 of the second cage is removed. If two cages abut each other back-to-back, one of the back-side panels 18 is removed. If one cage sets atop another cage, the top-panel 32 of the lower cage serves as the floor of the upper cage. Adjacent cage units are held together preferably by the same type of clamping means which hold together the units, such as the corral clamps.

Referring to FIGS. 3–6, the wire mesh 14 is affixed to the panels preferably by means of generally U-shaped clamps 38 which are closed upon the mesh and affixed to the straight members of panel tubing 4 by screw means 40, such as sheet metal pan head screws, which are screwed normally into the tubing by a rapidly turning screw driver such as a powered (electrically, pneumatically, or otherwise) screw gun. Rapidly driving the screws means into the tubing causes some plastic deformation of the polymeric material of the tubing. Some of the material displaced by the incoming screw means create a boss or shoulder 44 around the screw means and into the screw means threads 42 on the inside of the tubing, and at least some portion of the material adheres to the screw means due to the heat generated. This effect of rapidly driving the screw means into the tubing creates such a strong anchoring of the clamps 38 that any effort to forcibly pull a clamp from the tube to which it is screwed will most probably result in a fracture of the tube before the screw is pulled free. Since the mesh of each panel is firmly affixed to the frame work of the panel, the mesh lends structural support to the framework.

Alternately, the mesh can be affixed to the panels by means of nylon tie-wraps which are resistant to the damaging effects of ultraviolet radiation. This is important to cages which will be out of doors. The tie-wraps pass through marginal meshes of the wire mesh and are fastened around the marginal tubings of the panels. Alternately, clamps commonly known as "hog rings" can be used in place of the tie-wraps. The tie-wraps or hog rings will be used depending on the size of the animal being caged or the size of the kennel being constructed. However, these means of securing the mesh to the panel frameworks do not lend the structural support of the preferred means.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A knock-down cage comprising a plurality of rectangular panels each having a marginal frame comprised of a plurality of lengths of hollow plastic tubing, each length having a hardened outer skin to resist cold-flow, the lengths being glued at their ends by plastic elbow means in closed orthogonal relation, the panels being adjacent and marginally connected together by clamping means to form an enclosure of at least closed sides and closed top, the area defined by each panel being covered by mesh material connected to each length of tubing forming the panel and impassable to the cagee except for at least one panel which defines a portal for passage of the cagee into and out from the cage, and a door means associated with each portal hingedly hung on a cross member by a straight member of the door frame rigidly clamped to and in close juxtaposed relation with a sleeve loosely fitted over the cross member, associated with each portal for latchingly closing its associated portal.

2. The knock-down cage of claim 1 further comprising ultraviolet resistant tie-wraps for affixing the mesh to the marginal frame of each panel.

3. The knock-down cage of claim 1 including a plurality of U-shaped clamps which are closed upon the mesh and affixed to the plastic tubing by screw means rigidly driven into the tubing to cause plastic deformation about the entrance hole and create a boss around the screw means, interior of the tubing, to provide additional anchoring for the clamps.

4. The knock-down cage of claim 1 further including a resin incorporated into the plastic that makes the hollow plastic tubing resistant to the effects of ultra violet light (UV).

5. A plurality of cages comprising a plurality of rectangular panels, each having a marginal frame comprised of a plurality of lengths of hollow plastic tubing, each length having a hardened outer skin to resist cold flow, the lengths being glued together at their ends by plastic elbow means in closed orthogonal relation, the panels being adjacent and marginally connected together by clamping means to form a multiplicity of enclosures of at least closed sides and closed tops, the area defined by each panel being covered by mesh material connected to each length of tubing forming the panel and impassable to the cagee except for at least one panel which defines a portal for passage of the cagee into and out from the cage, and a door means hingedly hung onto a cross member by a straight member of the door frame rigidly clamped to and in closed juxtaposed relation with a sleeve loosely fitted over the cross member for latchingly closing its associated portal and wherein the enclosures share common panels between them.

6. The plurality of cages of claim 5 further comprising ultra violet resistant tie-wraps for affixing the mesh to the marginal frame of each panel.

7. The plurality of cages of claim 5 including a plurality of U-shaped clamps which are closed upon the mesh and affixed to the plastic tubing by screw means which are closed upon the mesh and affixed to the plastic tubing by screw means rapidly driven into the tubing to cause plastic deformation about the entrance hole and create a boss around the screw means, interior of the tubing, to provide additional anchoring for the clamps.

8. The plurality of cages of claim 5 further including a resin incorporated into the plastic that makes the hollow plastic tubing resistant to the effects of ultra violet light (UV).

* * * * *